July 5, 1949.  R. N. ROWE  2,475,338
ACTUATING MECHANISM FOR ENCLOSED SWITCHES
Filed Sept. 11, 1947  3 Sheets-Sheet 1
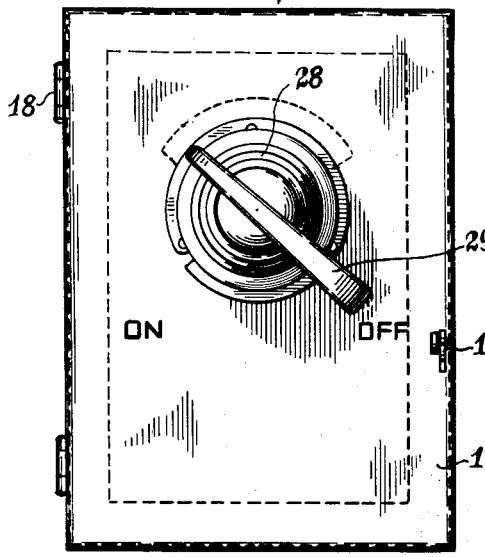
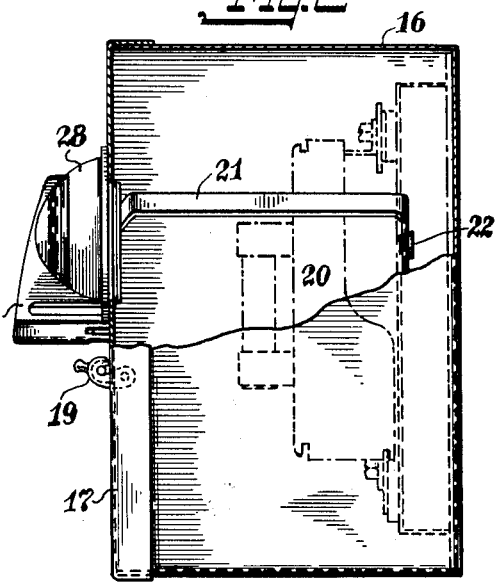
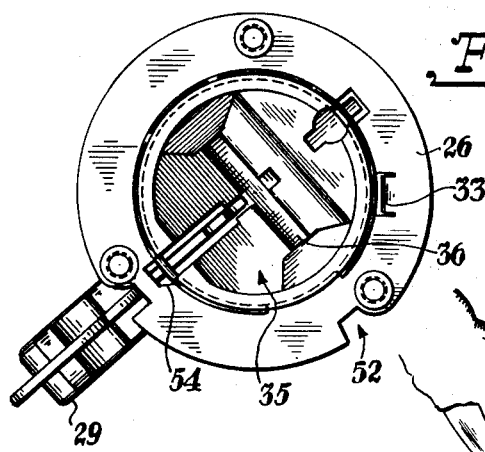
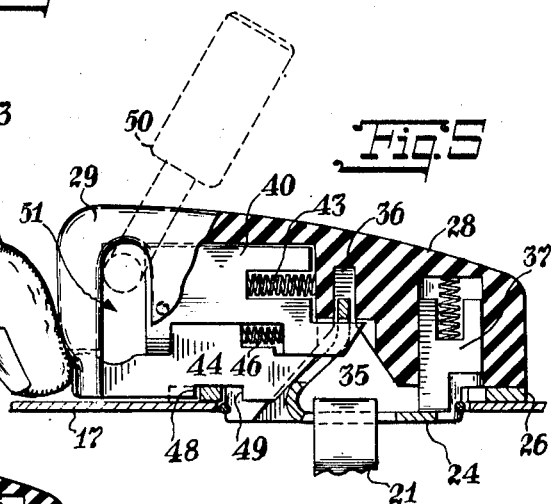
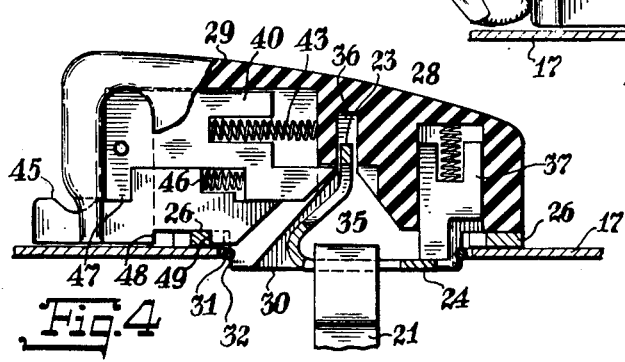
INVENTOR.
RAYMOND N. ROWE
BY
ATTORNEY July 5, 1949.  R. N. ROWE  2,475,338
ACTUATING MECHANISM FOR ENCLOSED SWITCHES
Filed Sept. 11, 1947  3 Sheets-Sheet 2
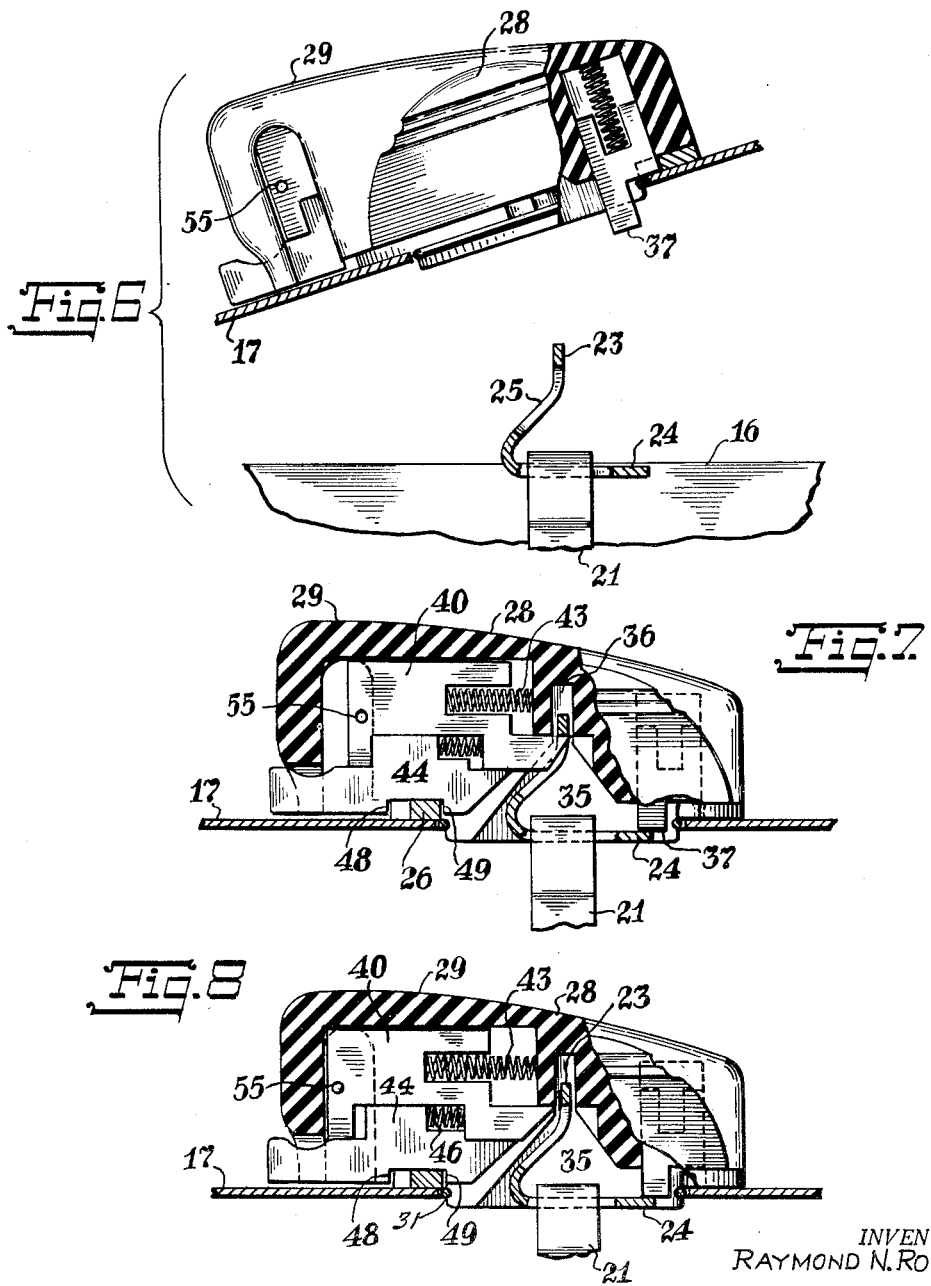
INVENTOR.
RAYMOND N. ROWE
BY
ATTORNEY July 5, 1949. R. N. ROWE 2,475,338
ACTUATING MECHANISM FOR ENCLOSED SWITCHES
Filed Sept. 11, 1947 3 Sheets-Sheet 3
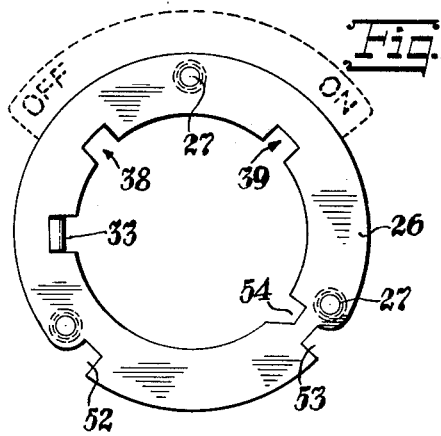
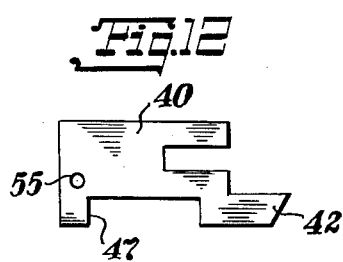
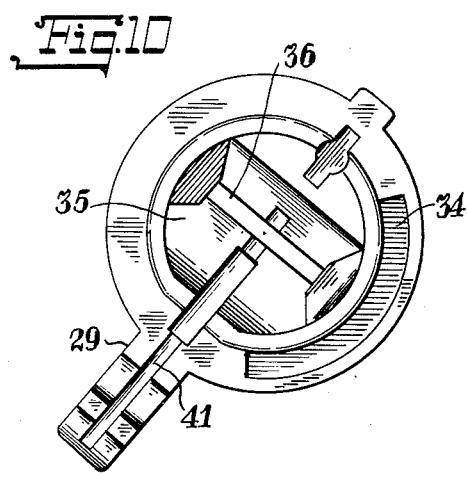
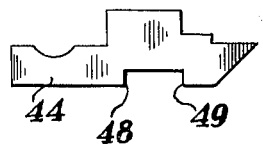
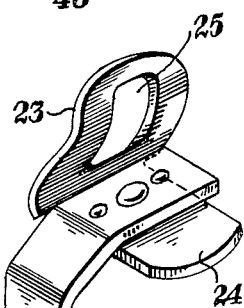
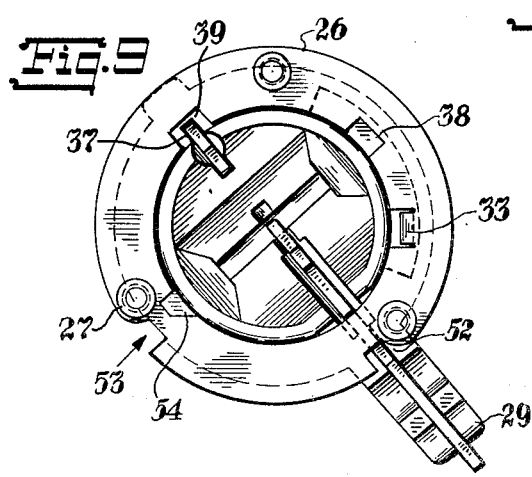
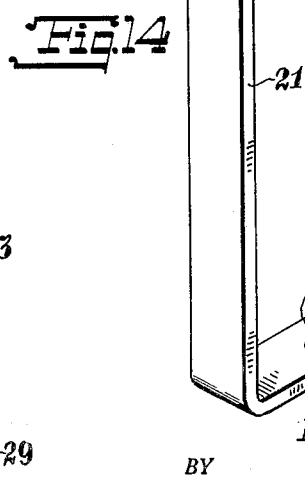
INVENTOR.
RAYMOND N. ROWE
BY
ATTORNEY Patented July 5, 1949

2,475,338

UNITED STATES PATENT OFFICE 2,475,338

ACTUATING MECHANISM FOR ENCLOSED SWITCHES

Raymond N. Rowe, Plainville, Conn., assignor to The Trumbull Electric Manufacturing Company, Plainville, Conn., a corporation of Connecticut Application September 11, 1947, Serial No. 773,381

12 Claims. (Cl. 200—50)

1

In the field of electrical control apparatus, particularly in devices known to the trade as enclosed safety switches, it is customary to house the apparatus in a protective box or casing and to have an operating handle on the side or cover of the box. A padlock or seal is provided for preventing unauthorized opening of the box cover, and additional padlocks are used to lock the operating handle in one or the other or each of its "on" and "off" positions. Although normally a cover interlock is made to prevent opening of the cover while the switch or other control is in its "on" position, it is sometimes desirable to provide a special means whereby this interlock may be defeated, in order to permit an authorized person to inspect the interior of the box while current is passing through the enclosed apparatus.

My invention relates to improvements in arrangements for locking the cover and the handle of a switch box, and for obtaining a defeatable interlock for the cover. Because, in the example shown, I apply my invention to a construction wherein the exterior operating handle is carried by the cover and becomes disconnected from the interior mechanism when the cover is opened, I also have provided a special positioning latch which normally prevents movement of the handle when the cover of the box is opened.

I have accomplished all of the desirable functions outlined above by building the necessary mechanisms entirely within or immediately under the handle of the switch, excepting for one element which projects from the end of the interior switch-operating shaft.

For a more complete understanding of the invention, as well as a knowledge of the deails of the preferred form, reference is made to the following specification and the accompanying drawings in which:

Fig. 1 is a front view of a switch box with a handle-actuating device embodying one form of my invention on a small scale.

Fig. 2 is a side view of the same, parts being broken away to show the switch actuating shaft and the location of the switching mechanism.

Fig. 3 is a view on a larger scale of the underside of the handle device and the supporting and interlocking parts which are carried by the cover, the various parts being shown in the unlocked "off" position.

Fig. 4 is a side view and partial section of the handle device, mounted on a section of the cover and showing the cover-closed position relative to the upper end of the actuating shaft, the parts

2 of the handle device being shown in the unlocked and "off" position.

Fig. 5 is a view of the similar parts but in the cover closed and locked position.

Fig. 6 is a partial section and side elevation showing the relation of the handle and shaft in the partially opened position of the cover.

Fig. 7 is a partial section and side elevation similar to Fig. 5 but with the switch "on" and the cover latched but not padlocked.

Fig. 8 is a view similar to that of Fig. 7 but with the latch retracted and ready for opening the cover.

Fig. 9 is a view of the underside of the handle and mounting ring removed from the cover, the parts being in the unlocked position they occupy when the switch is in the "on" position.

Fig. 10 is a view of the underside of the handle alone.

Fig. 11 is a plan view of the locking ring alone.

Figs. 12 and 13 are side views of the upper cover latching slide and the bottom handle locking slide respectively.

Fig. 14 is a perspective view of the switch actuating shaft showing the parts which coact with the latching mechanism.

Although the invention relates to the handle mechanism and its relation to the operating shaft and the cover of an enclosed switch, I have shown in Figs. 1 and 2 the relation of the invention to a conventional enclosed switch where the box 16 has a cover 17 hinged at 18 and usually provided with a latch 19.

The switch per se 20 may be of any suitable character and is provided with an actuating shaft 21 mounted to turn about an axis 22 in operating the switch. The upper end of this shaft has a tongue 23 and a foot 24, the tongue being provided with a recess or opening 25 to receive a locking bolt. The cover has an abutment member preferably in the form of a ring 26 suitably secured to the cover for instance by lugs 27, the center of the ring being coaxial with the axis 22 of the shaft. The handle 28 may conveniently be formed of molded plastic and have a grip portion 29. The handle has a skirt 30 depending from its lower edge into an opening in the cover and held in place by split ring 31 which fits into a groove 32 beneath the inner edge of the ring 26. To limit the rotation of the handle I provide the ring with a lug 33 which projects upwardly into a segmental groove 34 coaxial with the handle body.

The lower face of the handle is provided with a wedge shaped recess 35 and a slot or pocket 36 to receive the tongue 23 of the actuating shaft.

A spring pressed plunger 37 acts as a latch projecting into one of the notches 38 or 39 in the inner edge of the abutment ring 26 when the cover is open and the switch handle is in the "off" or "on" position as the case may be. When the cover is closed the latch member 37 engages the foot 24 of the actuating shaft so as to retract the latch from the ring 26 leaving the handle free to be rotated.

The locking bolt 40 is guided in groove 41 in the handle member and has a tip 42 adapted to interlock with the tongue 23 of the actuating shaft when the cover is closed. This bolt is biased by a spring 43 toward an unlocked position.

A control bolt 44 is also slidable in the handle and has an extension 45 by means of which it may be pushed inwardly. A spring 46 is interposed between the locking bolt 40 and the control bolt and tends to bias the control bolt against the shoulder 47 on the locking bolt. The lower edge of the control bolt has a notch with shoulders 48 and 49 which limit the movement of the control bolt with respect to the mounting ring 26.

When the cover is closed, the plunger 37 is retracted from the ring 26 so that the handle is free to be turned from the "on" position of Figs. 7, 8 or 9 and thus rotate the actuating shaft 21. When the locking bolt and the control bolt are in the position of Fig. 7, the cover cannot be opened. When the bolts are in the position of Figs. 4 and 8, the bolt 40 is retracted and the cover is free to be opened or closed.

In order to seal or padlock the handle in either the "on" or "off" position, the bolt 40 is forced to the right as shown in Fig. 5 and a padlock or seal 50 inserted through the passage 51 in the handle. In order to permit the control bolt to be moved to the position of Fig. 5, the ring 26 is provided with notches 52 and 53. Notch 52 is in the position which permits the handle to be locked when the switch is in the "on" position, and notch 53 is in the position to permit the handle to be locked when the switch is in the "off" or open circuit position. When the switch is in the "off" position, the cover may be opened since in the absence of a padlock or other seal, the control bolt 44 is pushed outwardly with the shoulder 49 passing into notch 54 in the ring 26. (See Fig. 4.)

In order to be able to open the cover when the switch is in the "on" position, it is necessary to retract the locking bolt to the position of Fig. 8 by inserting a tool into the opening 51 to engage the bolt 40 as for instance in hole 55 in the end of the bolt which is accessible in the recess 51. When the bolt 40 is thus retracted, the spring 46 is compressed by the retraction of the bolt 40.

It will be understood that to facilitate the various locking and unlocking movements of the bolts that the spring 46 is made much stronger than the spring 43.

It should be understood that when the cover is to be closed the handle 28 should be rotated to a position corresponding to the "on" or "off" position in which the actuating shaft 21 is at that time, in order that the recess in the handle will be in the proper position to receive the outer end of the shaft. When the handle is in such a position the locking bolt will be automatically retracted by the engagement of its bevelled tip with the tip of the shaft 21 if it has not already been retracted. The shape of the recess in the handle and the shape of the outer end of the shaft are such as to center the handle on the shaft in case they are not in exact alinement when the cover is being closed.

By proper design of the parts I have also made it possible to use a single padlock to serve the dual function of locking the operating handle in any desired position and at the same time of locking the box cover closed. There are few parts, inexpensive and easy to fabricate and assemble, thus recommending the invention for wide use in a variety of commercial applications.

I claim:

1. In an enclosed switch having a box with a movable cover and an abutment, the combination of make and break mechanism within the box having an actuating shaft extending into proximity to the cover, an operating handle rotatably carried by the cover and having a recess to receive the outer end of the shaft when the cover is closed, a plunger carried by the handle, a spring for projecting said plunger into interlocking engagement with the abutment and prevent rotation of the handle when the cover is opened, said shaft having a foot engaged by said plunger when the cover is closed whereby said plunger is retracted from said abutment, a locking bolt carried by the handle and slidable into engagement with said shaft when the cover is closed, and manually defeatable means for preventing disengagement of said bolt from said shaft when the cover is closed and the switch is "on."

2. In an enclosed switch having a box with a movable cover, the combination of an actuating shaft extending into proximity to the cover, an operating handle rotatably carried by the cover and having a recess to receive the outer end of the shaft when the cover is closed, a plunger carried by the handle, a spring for coacting with said plunger to prevent rotation of the handle when the cover is opened, said shaft having a foot engaged by said plunger when the cover is closed whereby said plunger is retracted from said abutment, a locking bolt carried by the handle and slidable into engagement with said shaft when the cover is closed, and a spring pressed control member coacting with said locking bolt in said handle and interlocking said control member with the cover.

3. The combination in an enclosed switch having a box with a cover, an abutment member on the cover, a handle mounted to rotate in the cover and extending through said cover and having a recess, an actuating shaft mounted in the box coaxial with said handle and having a portion extending into the recess in the handle when the cover is closed, a locking bolt mounted in the handle to slide into engagement with said shaft and a control bolt slidable in said handle and coacting with said abutment member and with said locking bolt to prevent rotation of the handle when the control bolt is in one position but to release the handle and permit its rotation when the control bolt is in another position.

4. Switch actuating means comprising a handle rotatably mounted on the cover of a switch box and having a recess for receiving the outer end of an operating shaft, a locking bolt slidably mounted in the handle to interlock with the operating shaft, a control bolt biased to move said locking bolt into an interlocking position and a mounting ring for said handle having notches with shoulders interlocking with said control bolt.

5. Switch actuating means comprising a handle rotatably mounted on the cover of a switch box and having a recess for receiving the outer end of an operating shaft, a locking bolt slidably mounted in the handle to interlock with the operating shaft, a control bolt biased to move said locking bolt into such an interlocking position, a mounting ring for said handle having shoulders and notches interlocking with said control bolt and a spring pressed latch carried by said handle interlocking with said ring when the cover is open.

6. The combination in an enclosed switch having a box with a cover, a ring mounted on the cover, a handle mounted to rotate in the ring and having a recess, an actuating shaft mounted in the box coaxial with said handle and having a portion extending into the recess in the handle when the cover is closed, a locking bolt mounted in the handle to slide into engagement with said shaft and a control bolt slidable in said handle and coacting with said ring and with said locking bolt to prevent rotation of the handle when the control bolt is in one position but to release the handle and permit its rotation when the control bolt is in another position and a latch carried by the handle coacting with the ring to prevent rotation of the handle when the cover is open and coacting with said shaft to permit rotation of the handle when the cover is closed.

7. Switch actuating mechanism comprising a ring to be mounted on the cover of a box containing contact devices and an actuating shaft, a handle rotatably mounted in said ring and having a recess to receive the end of the shaft, a locking bolt slidable in the handle to engage the shaft in the handle when the cover is closed, control means coacting with said ring and with said locking bolt to move the locking bolt into engagement with the shaft and coacting with said ring to prevent rotation of said handle when the cover is open.

8. Switch actuating mechanism comprising a ring to be mounted on the cover of a box containing contact devices and an actuating shaft, a handle rotatably mounted in said ring and having a recess to receive the end of the shaft, a locking bolt slidable in the handle to engage the shaft in the handle when the cover is closed, control means coacting with said ring and with said locking bolt to move the locking bolt into engagement with the shaft and coacting with said ring to prevent rotation of said handle when the cover is open and a latch carried by the handle for coacting with the ring to prevent rotation of the handle when the cover is open and coacting with said shaft to permit rotation of the handle when the cover is closed.

9. In an enclosed switch having a box with a movable cover, the combination of make and break mechanism within the box having an actuating shaft extending into proximity to the cover, an operating handle rotatably carried by the cover and having a recess to receive the outer end of the shaft when the cover is closed, a locking bolt carried by the handle biased away from the shaft but slidable into engagement with said shaft when the cover is closed, and a control bolt coacting with the locking bolt and biased away from said shaft and pressing the locking bolt toward said shaft.

10. A cover latching arrangement for an enclosed switch of the type having an openable cover and interior switching mechanism fixed within the enclosure with a movable switch-operating shaft in close proximity to the cover, said arrangement comprising an outer operating handle rotatably mounted on the cover to move between "on" and "off" positions and having a recess which operatively receives the shaft when the cover is closed, a ring on the cover, a latching bolt in the handle operated by said ring and movable into and out of latching engagement with the shaft, said ring being shaped to operate said bolt between a point where the bolt engages said shaft to latch the cover closed when the handle is in an "on" position and a point where the bolt is free from said shaft to unlatch the cover when the handle is in an "off" position.

11. A cover and handle latching and locking arrangement for an enclosed switch of the type having an openable cover and interior switching mechanism fixed within the enclosure with a movable switch-operating shaft in close proximity to the cover, said arrangement comprising an outer operating handle rotatably mounted on the cover to move between "on" and "off" positions and having a recess which operatively receives the shaft when the cover is closed, a ring on the cover, locking shoulders on the cover, a cover latching and handle and cover locking bolts in the handle operated by said ring engageable with said shoulders and movable into and out of latching engagement with the shaft, said ring being shaped to operate said bolt between a point where the bolt engages said shaft to latch the cover when the handle is in an "on" position, and a point where the bolt is free from said shaft to unlatch the cover when the handle is in an "off" position, and a lock to hold said bolt in engagement with said locking shoulders to prevent movement of said handle and opening of said cover when the handle is in either an "on" or an "off" position.

12. In an enclosed switch having a box containing switch mechanism and having a movable cover, said cover having an opening with an abutment member surrounding the opening, a handle carried by the cover and rotatable with respect to said abutment member and having a recess, an actuating shaft supported in the box and projecting through said opening into said recess when the cover is closed, a plunger carried by the handle and spring pressed to engage said abutment member and prevent rotation of said handle when the cover is open and retracted by engagement with a part of said actuating shaft when the cover is closed, a locking bolt carried by the handle, and a spring-pressed control bolt for forcing said locking bolt into interlocking engagement with the actuating shaft when the cover is closed and the circuit is closed, said abutment member having means for actuating said control bolt.

RAYMOND N. ROWE.

REFERENCES CITED

The following references are of record in the file of this patent:

UNITED STATES PATENTS

| Number | Name | Date |
| --- | --- | --- |
| 1,436,622 | Horton | Nov. 21, 1922 |
| 2,163,230 | Rowe | June 20, 1939 |
| 2,256,910 | Rowe | Sept. 23, 1941 |
| 2,263,760 | Currie | Nov. 25, 1941 |